United States Patent [19]

Nowobilski

[11] Patent Number: 5,298,226

[45] Date of Patent: Mar. 29, 1994

[54] PERFORATED PLATE FLUID DISTRIBUTOR AND ITS ASSOCIATED FIXED BED VESSEL

[75] Inventor: Jeffert J. Nowobilski, Orchard Park, N.Y.

[73] Assignee: Praxair Technology, Inc., Danbury, Conn.

[21] Appl. No.: 955,787

[22] Filed: Oct. 2, 1992

[51] Int. Cl.⁵ .................................... B01D 50/00
[52] U.S. Cl. ............................. 422/171; 422/172; 422/176; 422/177; 422/180; 422/211; 422/311
[58] Field of Search ............... 422/311, 176, 143, 179, 422/171, 177, 211, 220–222, 238, 239, 172, 190, 191, 193, 180; 34/57 A; 110/245; 122/40; 431/7, 170; 165/104.16

[56] References Cited

U.S. PATENT DOCUMENTS

| | | | |
|---|---|---|---|
| 2,632,692 | 3/1953 | Korin et al. | 422/191 |
| 2,934,411 | 4/1960 | Purse | 422/311 |
| 2,976,132 | 2/1958 | Dinwiddie et al. | 23/288 |
| 2,980,515 | 4/1961 | Horner et al. | 23/288 |
| 3,079,222 | 2/1963 | Reeve | 422/142 X |
| 3,419,253 | 12/1968 | Eckert | 422/311 X |
| 3,787,188 | 1/1974 | Lyon | 23/288 R |
| 4,126,540 | 11/1978 | Grosboll et al. | 422/120 |
| 4,350,665 | 9/1982 | Hashimoto et al. | 422/191 |
| 4,743,433 | 5/1988 | Smith | 422/220 |
| 4,788,040 | 11/1988 | Campagnolo et al. | 422/220 |
| 4,836,989 | 6/1989 | Aly et al. | 422/191 X |
| 4,865,820 | 9/1989 | Dunster et al. | 422/220 |
| 4,880,604 | 11/1989 | Koves | 422/218 X |
| 4,931,259 | 6/1990 | Okamoto et al. | 34/57 A |

Primary Examiner—Robert J. Warden
Assistant Examiner—Amalia L. Santiago
Attorney, Agent, or Firm—Chung K. Pak

[57] ABSTRACT

The present invention relates, in general, to apparatus for providing uniform fluid flow in vessels having packing materials or particulates and, in particular, to apparatus for providing uniform gas flow in pressure swing adsorbent vessels.

11 Claims, 4 Drawing Sheets

PERFORATED PLATE FLUID DISTRIBUTOR AND ITS ASSOCIATED FIXED BED VESSEL

FIELD OF THE INVENTION

The present invention relates, in general, to apparatus for providing uniform fluid flow in vessels having packing materials or particulates and, in particular, to apparatus for providing uniform gas flow in pressure swing adsorbent vessels.

BACKGROUND OF THE INVENTION

The efficiency of reaction or separation processes is significantly affected by the way in which the feed fluid introduced to process vessels is distributed. Fluid distribution in the process vessels influences the reaction or separation surface area available to the fluid. To utilize the maximum reaction or separation surface area, the fluid needs to be uniformly distributed in the process vessels.

In many process vessels, a fluid stream is introduced through small pipes. The fluid stream moving through the pipes flows at a high velocity and enters the process vessels normally in the head region as a jet. This jet must expand into the process vessels with about one hundred times or more the cross-sectional area to obtain a uniformly distributed flow. If the uniformly distributed flow is not obtained, the jet may propagate along the center axis of the process vessels at a high velocity. Consequently, all of the available reaction or separation surface area is not fully utilized, thereby decreasing the yield of the desired product. Even worse, particles or packings, such as catalysts or adsorbents, in the process vessels may be damaged because a high velocity jet can blow loosely filled particles or packings into the walls of the process vessels and/or can cause local fluidization at the bottom of the process vessels.

To avoid the problems associated with the pipes, an insert basket or a deflector plate, which has a slightly larger diameter than the pipes, is utilized in the process vessels. These insert basket and deflector plate have a plurality of slots or openings, which are useful for expanding a jet stream from the pipes. Though the basket or plate minimizes the problems associated with the pipes, they are not effective in generating a uniform flow velocity across the entire cross-section of the process vessels. When, for example, the basket is deep or the deflector plate is located substantially below the pipes, a substantial portion of the entering jet may turn slightly to bypass the bottom plate of the basket or the deflector plate, thus impinging on the outer section of the process vessels. If the basket is shallow or the deflector plate is located just below the pipes, the jet may turn ninety degrees and flow along the walls of the process vessels. In both situations, the velocities generated can entrain packing materials or particles on the top of the process vessels.

Therefore, there is a genuine need to find a better way to engender a uniform velocity across the entire cross-section of the process vessels having packing materials or particles. The enhancement of fluid distribution, i.e., improved uniformity, allows for the use of all the available reaction or separation surface area in the process vessels, thereby efficiently increasing the yield of the desired product.

SUMMARY OF THE INVENTION

The present invention relates to apparatus for achieving a uniform fluid flow in a vessel containing a fixed bed of packing materials or particles. The apparatus are structured such that processes, such as pressure or temperature swing adsorption processes, can be carried out efficiently. The apparatuses comprise a perforated plate fluid distributor having interior, middle and outer sections, with the interior section being an area surrounding a central point at which a feed stream is impinged, the middle section being an area at least partially surrounding the interior section and the outer section being an area at least partially surrounding the middle section. The densities and/or sizes of openings or perforations on the perforated fluid distributor plate are varied such that the middle section has a smaller total open or perforated area than the outer section but a larger total open or perforated area than the interior section. The total open or perforated area of said interior section is about 0% to about 20% based on the total surface area on the top side of said interior section, said total open or perforated area of said middle section is about 2% to about 60% based on the total surface area on the top side of said middle section and said total open or perforated area of said outer section is about 4% to about 100% based on the total surface area on the top side of said outer section. This perforated plate fluid distributor is sealed onto the interior surface of the vessel above and/or below at least one fixed bed of particles or packing materials to prevent or reduce any leakage of fluid at the outer edge of the perforated plate fluid distributor. At least one fixed bed of particles or packing materials placed in the vessel is designed to provide a uniform void volume in the range of about 26% to about 47.7% based on the actual fixed bed volume (the total volume of the fixed bed taken up by the particles of packing materials).

As used herein, the term "the densities of openings or perforation" means a number of openings or perforations in a given area which can be increased or decreased by altering the distance or space between the openings or perforations.

As used herein the term "fluid" means any liquid or gas, such as a gas or liquid containing one or more of oxygen, nitrogen, argon, helium, hydrogen, etc.

As used herein the term "the top side of a perforated plate fluid distributor" means the side of a perforated plate fluid distributor, which a jet entering the process vessel impinges on.

As used herein the term "sealed" refers to a condition of a fluid flow through an area between the distributor and the process vessel, wherein the velocity of the fluid flow through that area is not more than about 1% of the average velocity of a fluid flow passing through a perforation in the distributor.

DETAILED DESCRIPTION OF THE INVENTION

The present invention lies in the recognition that an improved uniform fluid velocity can be achieved across the entire or substantially entire cross-section of a process vessel containing at least one fixed bed of particles or packing materials by using at least one particularly designed perforated plate fluid distributor and/or arranging at least one particularly designed perforated plate fluid distributor in a particular manner in the process vessel. When a particularly packed bed is used in conjunction with at least one particularly arranged perforated plate fluid distributor, the distribution of fluid along the vessel is further enhanced.

Figure 1:
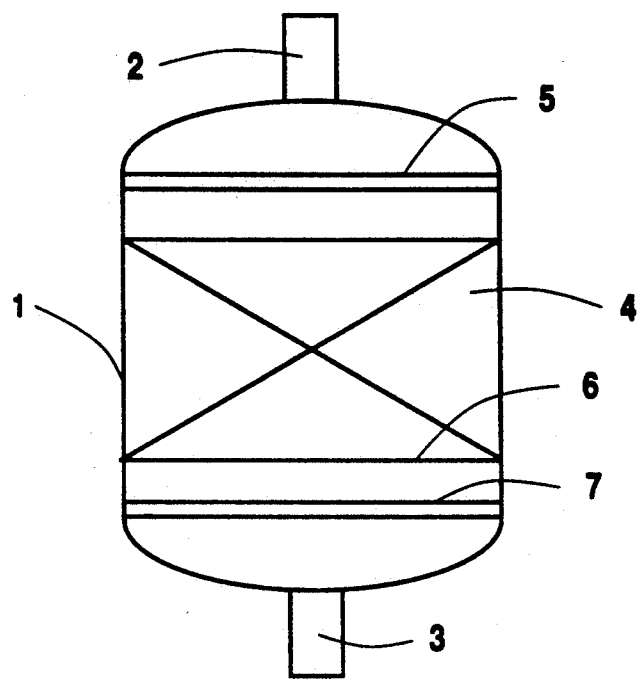
FIG. 1 shows one embodiment of the invention, which is drawn to a fixed bed vessel having at least two perforated plate fluid distributors.

Now referring to FIG. 1, a vessel (1) having inlet and outlet pipes (2 or 3) are illustrated. Within the vessel (1), at least two perforated plate fluid distributors (5 and 7) and a fixed bed of particles or packing materials (4) are placed. The fixed bed (4) is normally supported by a bed support (6).

To this vessel (1), a fluid feed, such as air, is fed through the inlet pipe (2 or 3), which may be or may not be in the form of a nozzle or nozzles. The inlet pipe (2 or 3), which is located either above or below at least one of the perforated plate fluid distributors (5 or 7), has at least one orifice having a preferred diameter in the range of about 6 inches to about 35 inches. The preferred size of the orifice allows for the economical operation of the inlet pipe or nozzle without excessive pressure drop. This orifice is placed from about 6 inches to about 42 inches, preferably about 12 inches to about 36 inches, above or below the nearest perforated plate fluid distributor (5 or 7) to improve the uniform distribution of fluid. Although the orifice is normally directed to the center of at least one perforated plate flow distributor (5 or 7), it can be directed to a location other than the center as long as at least one perforated plate fluid distributor (5 or 7) is appropriately designed.

Figure 2:
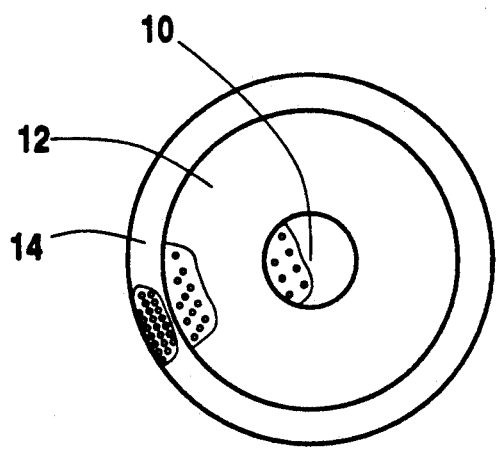
FIG. 2 shows one embodiment of the invention, which is drawn to a perforated plate fluid distributor having interior, middle and outer sections.

As the fluid stream enters the vessel (1) from the inlet pipe (2 or 3) or a nozzle, a jet is formed which starts to expand and impinge on at least one perforated plate fluid distributor (5 or 7). As shown by FIG. 2, the distributor (5 or 7) is designed to provide interior, middle and outer sections, (10, 12 and 14), with the interior section (10) being an area surrounding a central point at which a fluid feed stream is impinged, the middle section (12) being an area at least partially surrounding the interior section (10) and the outer section (14) being an area at least surrounding the middle section (12). Generally, the interior section (10) covers an area which is within about 4 to 30 inches from the central point at which a fluid feed stream is impinged while the middle and outer sections (12 and 14) cover areas which extend from about 2 to about 144 inches and from about 2 to about 60 inches from the outer edges of the interior and middle sections, respectively. The densities or sizes of openings or perforations on the interior, middle and outer sections (10, 12 and 14) are varied such that the middle section (12) is designed to have a smaller total open or perforated area than the outer section (14) but a larger total open or perforated area than the interior section (10).

Figure 3A:
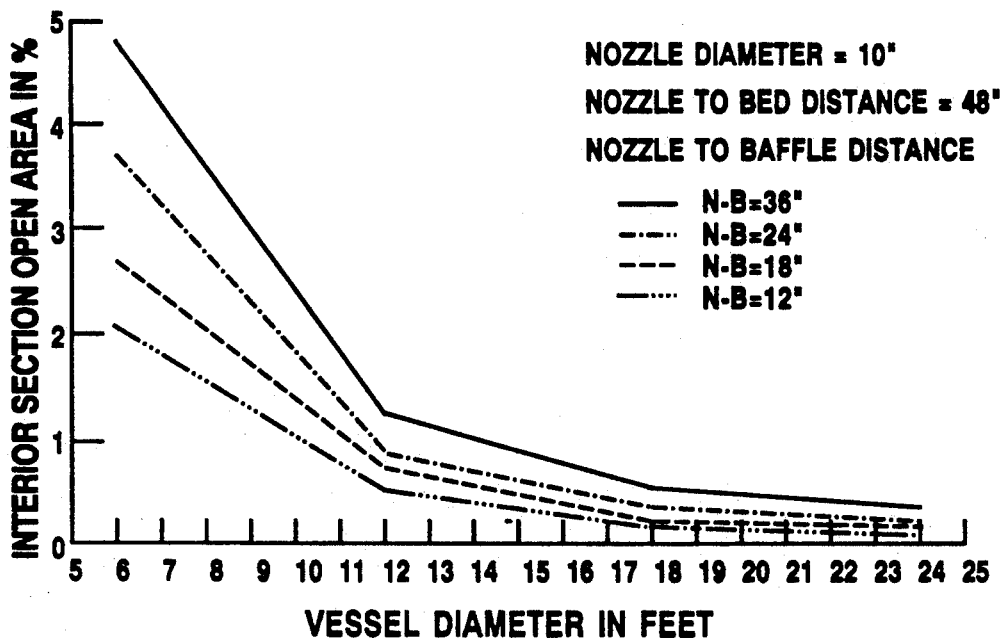
FIGS. 3a, 3b and 3c are graphs illustrating an interior section open area which is a function of the location of a nozzle, the diameter of a nozzle, the location of a perforated plate fluid distributor, the location of a fixed bed and the diameter of a vessel.
Figure 3B:
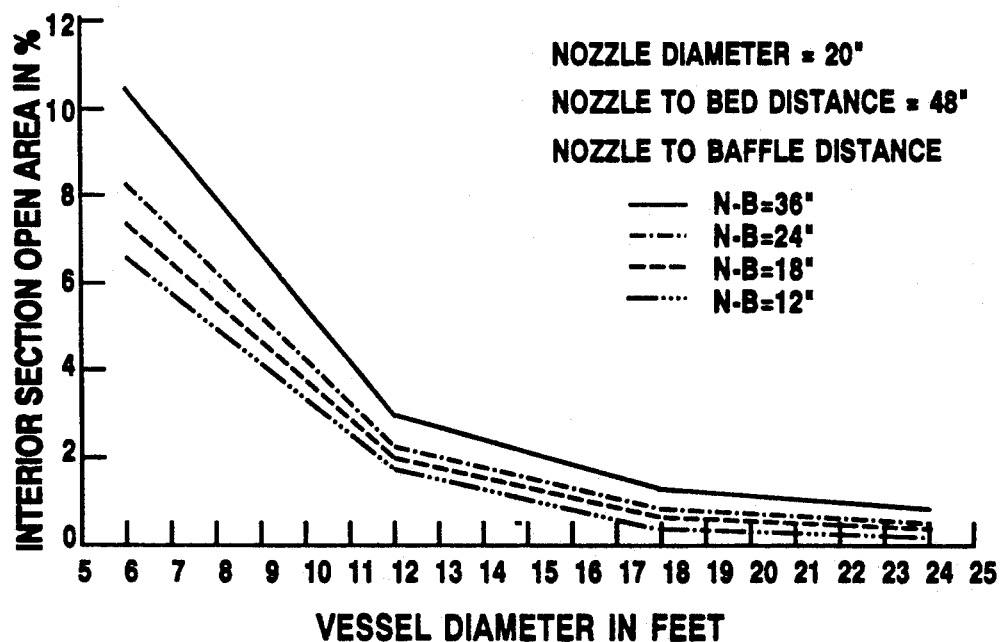
Figure 3C:
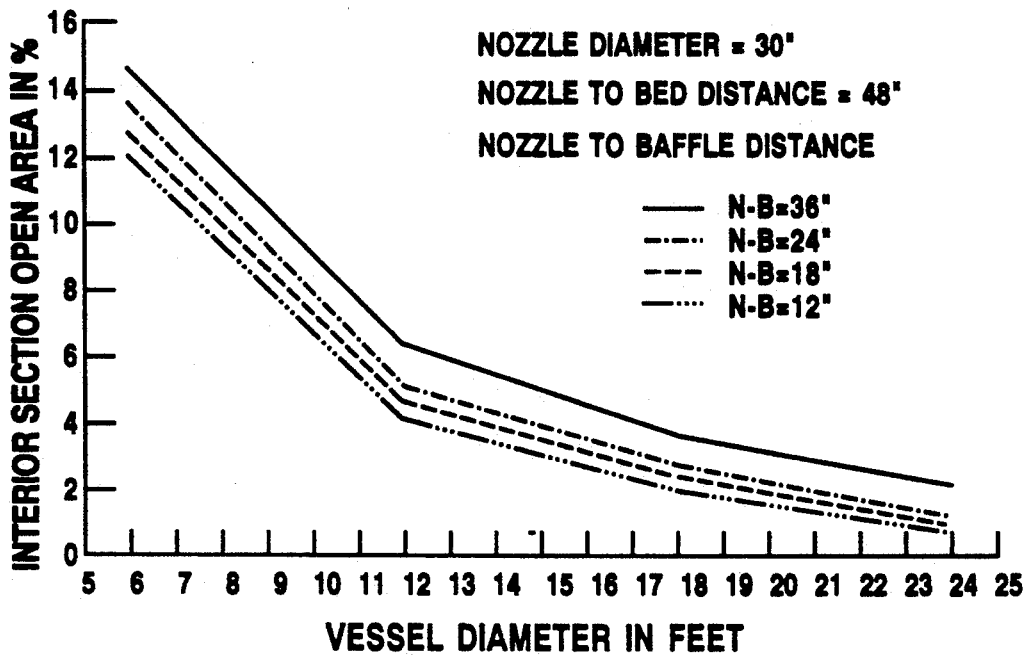
Figure 4A:
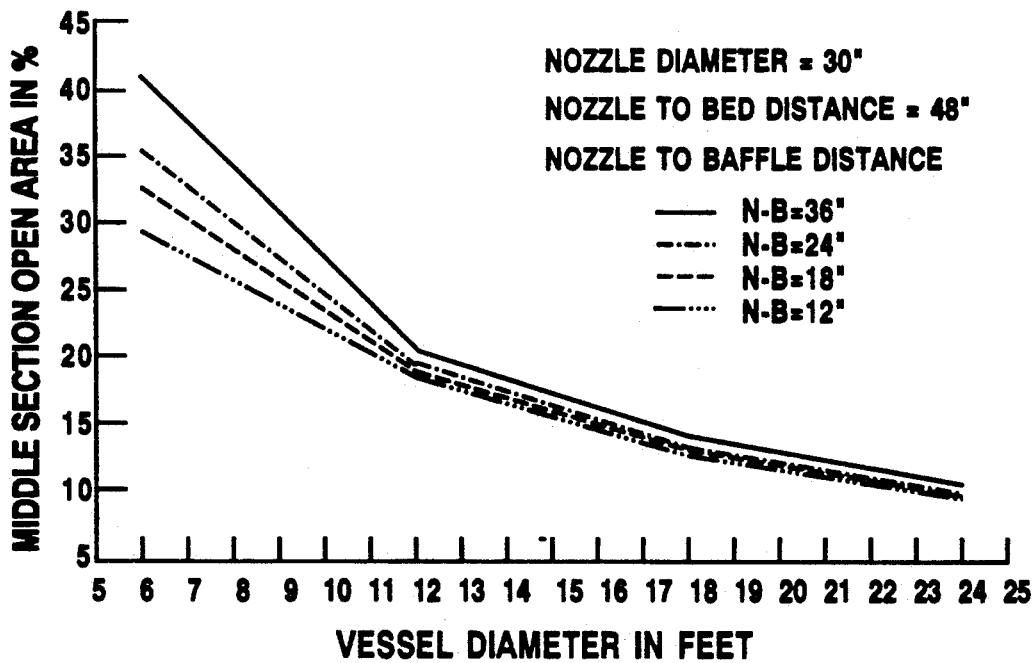
FIGS. 4a, 4b and 4c are graphs illustrating a middle section open area, which is a function of the location of a nozzle, the diameter of a nozzle, the location of a perforated plate flow distributor, the location of a fixed bed and the diameter of a vessel.
Figure 4B:
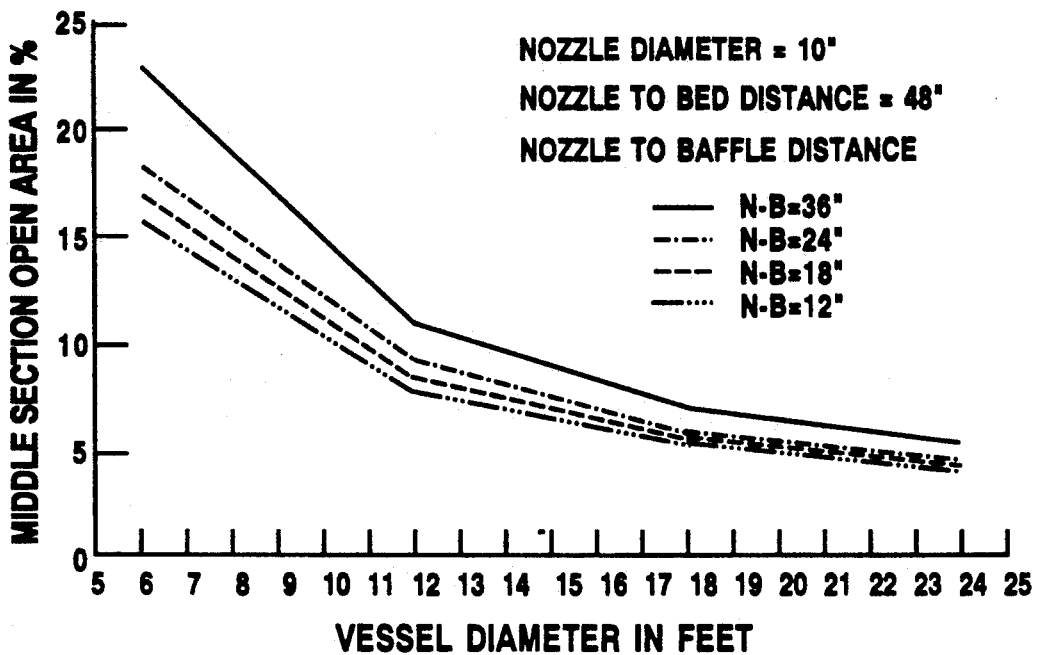
Figure 4C:
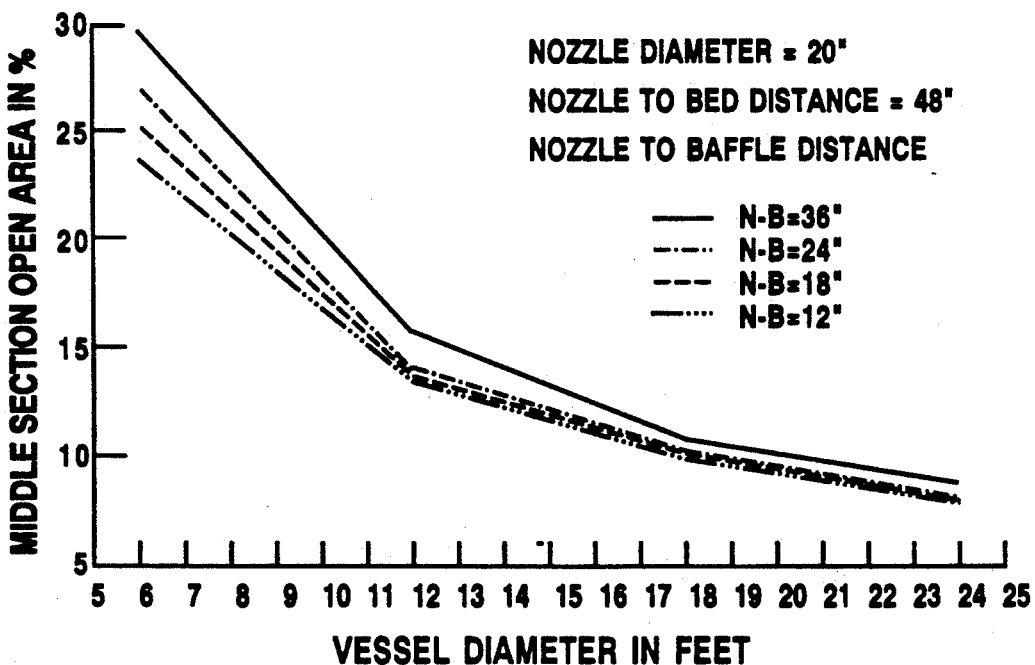

The total open or perforated areas are defined in terms of the design curves in FIG. 3(a), 3(b) and 3(c) for the interior section and FIGS. 4(a), 4(b) and 4(c) for the middle section. These figures indicate that the total open area on each section of the perforated plate fluid distributor (5 and 7) is a function of the location of a nozzle or inlet pipe, the diameter of the nozzle or inlet pipe, the location of the distributor, the location of a fixed bed and the diameter of a vessel. For instance, an increase in a nozzle diameter results in a lower fluid expansion ratio which in turn calls for a larger total open area on each section. Similarly, with increase in the nozzle to distributor distance, the fluid expansion ratio is reduced, thus requiring a larger total open area on each section. Due to these factors, the total open area for the interior section may be varied from +200% of its design value defined by the curves in FIGS. 3(a), 3(b) and 3(c) to no open area. The middle section open area also could range from +200% to −80% of the design value defined by the curves in FIGS. 4(a), 4(b) and 4(c). The outer section open area could range from about 100% to about −25% of the theoretical value. The theoretical value of the outer section open or perforated area is selected to provide a fluid flow which is sufficient to impart the average value of the fixed bed velocity in the bed area under the outer section of the distributor and in the bed area not under the distributor. The outer section open or perforated area may be equal to the area not covered by the distibutor and may have twice the open area of the middle section. This arrangement allows twice the fluid flow per unit area through the outer section compared to the middle section, which then distributes itself to the bed area under the outer section as well as the bed area at the outer edge of the vessel, which is not covered by the distributor. Generally speaking, the total open or perforated area of said interior section is about 0% to about 20%, preferably about 0.1% to about 15%, based on the total surface area on the top side of the interior section, the total open or perforated area of the middle section is about 2% to about 60%, preferably about 4% to about 50%, based on the total surface area on the top side of the middle section and the total open or perforated area of the outer section is about 4% to about 100%, prerferably about 4% to about 80%, based on the total surface area on the top side of the outer section.

The perforations or openings on each section are preferably made of punched round holes although other shapes, such as square or triangle or circular holes with or without a downward angle expansion, can be employed. Normally, the punched round holes have a diameter in the range of about 0.06 inches to about 1 inch, preferably about 0.25 to about 0.45 inches to uniformly distribute the fluid with the minimum pressure loss in fluid velocity. The space or distance between the openings on the top side of the interior section is within the range of about 0.13 inches to about 12 inches, and the top side of the middle section is within the range of about 0.075 inches to about 4.7 inches and on the outer section is within the range of about 0.066 inches to about 4 inches. The space between the openings on the top side of the middle is greater than the outer section, but is less than the interior section. The openings on each section is normally uniformly spaced to enhance uniform distribution of fluid.

The above perforated plate fluid distributor (5 or 7) is preferably designed to be placed in the top and bottom head sections of the vessel (1). By placing the distributor in the top and bottom head sections, greater vessel space is made available for particles or packings, which promote either separation or chemical reaction. When the distributor (5 or 7) is sealed onto the interior surface thereof, the leakage of fluid at the outer edge of the distributor is reduced or prevented, thus improving the uniformity of fluid distribution. While the term "the top head section" means spherical, eliptical or other shape sections, which closes the top end of the cylindrical vessel, the term "the bottom head section" means spherical, eliptical or other shape sections, which closes the bottom end of the cylindrical vessel.

The particular location of the distributor (5 or 7) in the top and bottom head sections is normally determined by the expansion of the fluid stream issuing from the openings in the distributor (5 or 7). The fluid stream should be able to expand at an angle of about 5° to 22.5° in the shape of a cone from any openings. The distributor (5), however, should be placed such that the fluid stream expands to no more than about 3/5, preferably about 1/2, the hole spacing. In other words, it should not be placed too close or too far from the fixed bed (4). Placing the distributor plate too close to the particle bed will result in nonuniform flow at the top of the bed because the jet will not have expanded to fill the area between the holes in the distributor plate. At high flow-rates and with light particles, the jet can also scour the surface resulting in particle movement and breakage of the particles. Placing the distributor plate further from the bed wastes vessel volume. Consequently, the distributor (5) is usually located at least 1 inch above or below the fixed bed (4) but not more than about 24 inches above or below the fixed bed (4).

As the fluid impinges on the distributor (5 or 7) particularly placed in the bottom or top head section of the vessel, the fluid is allowed to flow through the interior, middle and outer sections of the distributor. Due to the varied densities and/or sizes of openings on the distributor, the mass fluid flow per unit area through the distributor is normally the same as the average mass fluid flow per unit area through the fixed bed. The distributor takes into account a high dynamic pressure of the impinging jet and a high static pressure due to a low friction factor on the interior section and the pressure losses resulting from the expanded jet and a high friction factor on the middle and outer sections.

The fluid stream passing through the distributor is uniformly distributed to the fixed bed (4). Once the fluid is distributed, the desired product can be obtained either through adsorption, reaction or distillation. The fixed bed, of course, can be particularly designed to enhance the reaction, adsorption or distillation.

The fixed bed of particles or packing materials can be made up of adsorbents useful for separation, catalysts useful for reaction and/or packing materials useful for distillation. The preferred adsorbents employed are those useful for separating at least one air component (oxygen, nitrogen and/or argon) from air (a gas containing oxygen, nitrogen and possibly argon). These particles or packing materials are preferably sized to have a diameter in the range of about 0.06 inches to about 0.09 inches and are loaded in such a manner to have a uniform void volume in the range of about 26% to about 47.7% based on the actual fixed bed volume. The loading of particles or packing materials may be accomplished by feeding the particles or packing materials into a hopper attached to a conduit which is being rotated inside the vessel. The conduit contains series of holes which are appropriately spaced to achieve uniform distribution of the particles or packing materials per unit area of the bed. The conduit is generally inclined at an angle to insure the flow of particles or packing materials from the hopper to the conduit. The particles or packing materials in the conduit are allowed to fall through the holes and into the vessel. The rotational speed of the conduit can be varied to control the number of particles or packing materials falling onto the bed surface per revolution of the conduit, thus achieving the high packing density of the particle or packing bed defined by the above uniform void volume. As used herein the term "uniform void volume" refers to a volume which is not filled by solid particles for a unit fixed bed volume wherein such a volume is not varied no more than about 2%, preferably no more than 1%.

Once the desired product is formed in the above fixed bed, it is recovered through the outlet pipe (2 or 3). It should be understood that the outlet pipe location (2 or 3) for the desired product is altered to accommodate the fluid feed arrangement. Since the fluid feed is normally fed from the bottom of the vessel through the inlet pipe (3), the pipe (2) is normally used as the outlet pipe.

The following examples serve to further illustrate the invention. They are presented for illustraive purposes and are not intended to be limiting.

EXAMPLE 1

A vacuum pressure swing adsorbent plant was designed to produce about 50 ton of oxygen per day. The plant consists of two 12 ft. diameter vessels which are alternately cycled between about 6 psia and 20 inch Hg and 88 sec. cycle. The adsorbents employed to form a fixed bed have a diameter of 0.07 inches (8×12 mesh). This fixed bed has a nonuniform void fraction of about 40%. Upon feeding air into the vessel through an inlet pipe having a diameter of 20 inches following the above pressure swing sequence, the plant was producing only about 29 tons of oxygen per day.

To the top head section of each vessel, a 10 ft. diameter perforated plate fluid distributor was installed. The distributor was located at about 11 inches above the fixed bed. The distributor has interior, middle and outer sections, with the interior section covering about 22 inch diameter at the center of the distributor, the middle section extending from the edge of the interior section to about 34 inches and the outer section extending from the edge of the middle section to about 15 inches. The densities of openings or perforation on the interior, middle and outer sections are varied such that the interior section has the total open area of about 1.3% based on the total surface area on the top side of the interior section, the middle section has the total open area of about 11.5% based on the total surface area on the top side of the middle section and the outer section has the total open area of about 25% based on the total surface area on the top side of the outer section. The openings are designed to have a diameter of about 0.25 inches. This distributor was built in pieces to fit through the 20 inch diameter top inlet flange of the vessels and was bolted together in and through the top inlet flange. The edges of the distributor was not sealed to the head and at least about ½ inch gaps existed at the edges. Subsequent to the installation, the plant was operated to produce oxygen in the manner stated above. The production of oxygen was increased from about 29 tons per day to about 39 tons per day.

EXAMPLE 2

A vacuum pressure swing adsorbent plant was designed to produce about 50 ton per day. The plant consists of two vessels having a diameter of about 12 ft. To the top and bottom head sections of each vessel, the distributor described in Example 1 was welded (sealed). The bottom head distributor was located at about 8 inches below the fixed bed while the top head distributor was located at about 12 inches above the fixed bed. Each vessel also contains the same adsorbent materials as Example 1, which were loaded in such a manner to provide a uniform void volume of about 33% based on the actual bed volume. The resulting fixed bed has the same height as in Example 1. Upon operating the plant under the same condition as those indicated in Example 1, the production of oxygen was measured at about 49 tons per day.

As shown by the Examples, the production of oxygen or other products can be increased through using the particularly designed distributor. The increase in production of the desired product is even more significant through arranging the particularly designed distributor in a particular manner in a vessel containing a fixed bed of particles or packing materials.

In the above pressure swing gas separation processes, which involve feeding air from the bottom of the vessel, gas velocities in the top of the vessel during the purging and gas equalization steps are typically higher than the gas velocities in the bottom of the vessel during the air feeding step. Thus, the perforated plate fluid distributor is usually installed in the top head section of the vessel in order to enhance the performance of the pressure swing gas separation system.

Although the perforated plate fluid distributor and its arrangement in a fixed bed vessel have been described in detail in reference to certain embodiments, those skilled in the art will recognize that there are other embodiments of the invention within the spirit and scope of the claims.

What is claimed is:

1. A vessel comprising:
   a) an inlet for introducing a feed stream;
   b) an outlet for recovering a product stream;
   c) at least one fixed adsorbent bed having a uniform void volume of about 26.7% to about 47.7% based on the total bed volume being located between a top head section and a bottom section, said fixed adsorbent bed being capable of separating at least one fluid component from a fluid mixture; and
   d) at least one perforated plate fluid distributor positioned transversely with respect to a longitudinal axis of said vessel, said at least one perforated plate fluid distributor having top and bottom sides located at about at least 1 inch below said at least one fixed adsorbent bed, with its top side facing said at least one fixed adsorbent bed and its bottom side facing said inlet, said at least one perforated plate fluid distributor comprising interior, middle and outer sections, said interior section being an area surrounding the central point at which a feed stream is impinged, said middle section being an area at least partially surrounding said interior section, and said outer section being an area at least partially surrounding said middle section, wherein the perforation densities and/or the sizes of openings or perforations on said interior, middle and outer sections are varied such that said middle section has a smaller total open or perforated area than the outer section but a larger total open area than the interior section, with the total open or perforated area of said interior section being 0% to 20% based on the total surface area on the top side of the interior section, the total open or perforated area of said middle section being about 2% to about 60% based on the total surface are on the top side of the middle section and the total open or perforated area of said outer section being about 4% to 100% based on the total surface area on the top side of said outer section.

2. A vessel comprising:
   a) an inlet means for introducing fluid;
   b) at least one fixed bed of particles or packing materials; and
   c) at least two perforated plate fluid distributors positioned transversely with respect to a longitudinal axis of said vessel, said at least two perforated plate fluid distributors each having top and bottom sides, with at least one perforated plate fluid distributor's bottom side facing said at least one fixed bed which is placed between said at least two perforated plate distributors and at least one perforated plate fluid distributor being located at about at least 1 inch above or below its closest fixed bed, wherein said at least two perforated plate fluid distributors each comprises interior, middle and outer sections, said interior section being an area surrounding the central point at which fluid from said inlet means is impinged, said middle section being an area at least partially surrounding said interior section, and said outer section being an area at least partially surrounding said middle section, wherein the perforation densities and/or the sizes of openings or perforations on said interior, middle and outer sections are varied such that said middle section has a smaller total open or perforated area than the outer section but a larger total open area than the interior section, with the total open or perforated area of said interior section being 0% to 20% based on the total surface area on the top side of the interior section, the total open or perforated area of said middle section being about 2% to about 60% based on the total surface area on the top side of the middle section and the total open or perforated area of said outer section being about 4% to 100% based on the total surface area on the top side of said outer section.

3. The vessel according to claim 2, wherein at least one of said perforated plate fluid distributors is sealed onto the interior surface of the vessel whereby the leakage of fluid at the outer edge of at least one of said perforated plate fluid distributors is reduced or prevented.

4. The vessel according to claim 2, wherein said at least one fixed bed of particles is at least one adsorbent bed capable of separating at least one gas component select from the group consisting of oxygen, nitrogen and argon from air and wherein said adsorbent bed is designed to have a uniform void volume of about 26.7% to about 47.7% based on the actual fixed bed volume.

5. The vessel according to claim 2, wherein said inlet means comprises at least one nozzle which has an orifice having a diameter in the range of about 5 inches to about 35 inches.

6. The vessel according to claim 5, wherein the space or distance between said orifice of said at least one nozzle and said at least one of said at least two plate fluid distributors is in the range of about 6 inches to about 43 inches.

7. The vessel according to claim 2, wherein, at the top sides of said distributors, the space or distance between the openings or perforations on the interior section is within the range of about 0.13 inches to about 12 inches, the space or distance between the openings or perforations on the middle section is within the range of about 0.075 inches to about 4.7 inches and the space or distance between the openings or perforations on the outer section is within the range of about 0.066 inches to about 4.0 inches.

8. The vessel according to claim 7, wherein, at the top sides of said distributors, each opening or perforation on said interior, middle and outer sections has a diameter in the range of about 0.06 to about 1 inch at the tope sides of said distributors.

9. The vessel according to claim 8, wherein the openings or perforations on each section are uniformly spaced.

10. The vessel according to claim 2, wherein said interior section covers an area which is within about 4 to about 30 inches from said central point at which a feed stream is impinged, said middle section covers an area which extends from about 2 to about 144 inches from the outer edge of the interior section and said outer section covers an area which extends from about 2 to about 60 inches from the outer edge of said middle section.

11. The vessel according to claim 10, wherein said interior section is located at the center of said perforated plate flow distributor and is surrounded by said middle section.

* * * * *